(12) United States Patent
Ishikawa

(10) Patent No.: US 12,393,101 B2
(45) Date of Patent: Aug. 19, 2025

(54) CONTROL APPARATUS, LENS APPARATUS, AND IMAGING APPARATUS

(71) Applicant: CANON KABUSHIKI KAISHA, Tokyo (JP)

(72) Inventor: Daisuke Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 17/832,467

(22) Filed: Jun. 3, 2022

(65) Prior Publication Data

US 2022/0397803 A1    Dec. 15, 2022

(30) Foreign Application Priority Data

Jun. 9, 2021  (JP) ................................. 2021-096819

(51) Int. Cl.
*G03B 5/02* (2021.01)
*H04N 23/55* (2023.01)
*H04N 23/69* (2023.01)

(52) U.S. Cl.
CPC .............. *G03B 5/02* (2013.01); *H04N 23/55* (2023.01); *H04N 23/69* (2023.01); *G03B 2205/0046* (2013.01)

(58) Field of Classification Search
CPC .... H04N 23/67; H04N 23/69; G03B 3/00–12; G03B 5/00–02; G02B 7/04; G02B 7/09; G02B 7/10; G02B 7/102; G02B 7/105; G02B 7/28; G02B 7/282
USPC ............................................ 348/240.99, 345
See application file for complete search history.

(56) References Cited

U.S. PATENT DOCUMENTS

| | | | |
|---|---|---|---|
| 2002/0118965 A1* | 8/2002 | Ogg .......................... | G02B 7/04 396/79 |
| 2013/0050568 A1* | 2/2013 | Adachi .................... | G03B 3/10 359/698 |
| 2014/0293440 A1* | 10/2014 | Okawa ................. | G02B 15/145 359/698 |
| 2015/0260968 A1* | 9/2015 | Ohashi ................... | G02B 7/028 359/684 |
| 2020/0073078 A1* | 3/2020 | Shimomura ........... | G02B 7/028 |

FOREIGN PATENT DOCUMENTS

| | | |
|---|---|---|
| JP | 3581513 B2 | 10/2004 |
| JP | 4857257 B2 | 1/2012 |
| JP | 2012073584 A | 4/2012 |

* cited by examiner

*Primary Examiner* — Anthony J Daniels
(74) *Attorney, Agent, or Firm* — Canon U.S.A., Inc. IP Division

(57) ABSTRACT

An apparatus for an optical system including a first magnification varying lens configured to move with zooming, a second magnification varying lens of which a position is controlled based on a position of the first magnification varying lens, and a focus lens configured to adjust an in-focus position includes a detector configured to detect the position of the second magnification varying lens, and at least one processor and a memory coupled to the processor storing instructions that, when executed by the processor, cause the processor to function as a setting unit configured to set a driving range of the focus lens based on the position of the second magnification varying lens.

18 Claims, 7 Drawing Sheets

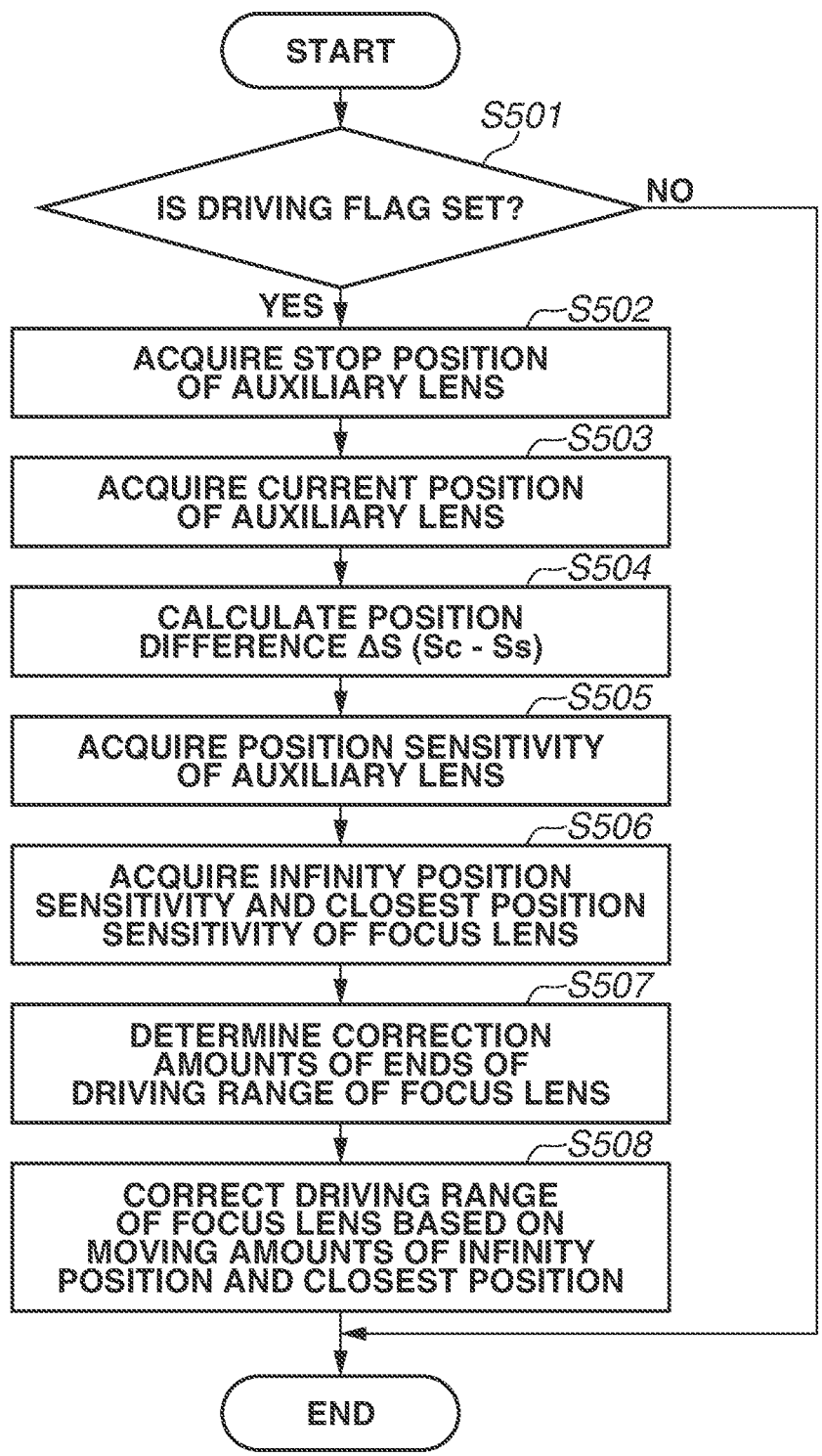

CONTROL APPARATUS, LENS APPARATUS, AND IMAGING APPARATUS

BACKGROUND

Technical Field

The aspect of the embodiments relates to a control apparatus, a lens apparatus, and an imaging apparatus.

Description of the Related Art

A lens barrel mechanically supporting a plurality of lens groups in an imaging apparatus includes structural members such as a mold member and a metal member. With a rise in the temperature of a surrounding environment where the imaging apparatus is placed or a rise in the temperature inside the main body of the imaging apparatus, the structural members of the lens barrel can mechanically expand and contract due to thermal expansion. This expansion and contraction can change the positional relationships between the lenses included in an imaging optical system. Consequently, the focus position can be shifted or the driving ranges of the lenses can change before and after the mechanical expansion and contraction.

To address these issues, Japanese Patent No. 3581513 and Japanese Patent No. 4857257 discuss techniques for mounting a temperature detection sensor in the main body of an imaging apparatus and correcting the position of a focus lens, the position of a zoom lens, and the driving ranges of the lenses based on a temperature change.

SUMMARY

According to an aspect of the embodiments, an apparatus for an optical system including a first magnification varying lens configured to move with zooming, a second magnification varying lens of which a position is controlled based on a position of the first magnification varying lens, and a focus lens configured to adjust an in-focus position includes a detector configured to detect the position of the second magnification varying lens, and at least one processor and a memory coupled to the processor storing instructions that, when executed by the processor, cause the processor to function as a setting unit configured to set a driving range of the focus lens based on the position of the second magnification varying lens.

Further features of the disclosure will become apparent from the following description of exemplary embodiments with reference to the attached drawings.

BRIEF DESCRIPTION OF THE DRAWINGS

FIG. 5 is a flowchart illustrating processing for setting a driving range of the focus lens according to the first exemplary embodiment.

DESCRIPTION OF THE EMBODIMENTS

In a first exemplary embodiment of the disclosure, a description will be given of an imaging apparatus that achieves excellent focus operability even in a case where temperature expansion and contraction differs from individual to individual.

In recent years, there has been a tendency to increase the size of a lens barrel in order to offer high image quality by giving a high-resolution feeling with 4K video images, increasing the size of an image sensor, and the like. On the other hand, there is a user demand for the downsizing of an imaging apparatus. If the downsizing of the lens barrel is promoted, the sensitivity (the position sensitivity) of the focus movement relative to the movement of a lens is to be increased.

If the position sensitivity of the lens is increased, the focus position or the driving range of the lens is affected more by the movement of a lens group that is caused by the expansion and contraction of the structural members of a lens unit due to thermal expansion. Particularly, the temperature expansion and contraction of mechanical members including a mold member varies greatly from individual to individual. Thus, even with the same temperature, the focus position or the driving range of the lens may change greatly from individual to individual, or in some cases, focusing on a desired subject may not be possible. To address the issues, in the present exemplary embodiment, a focus driving range is set based on the position of an auxiliary lens.

Figure 1:
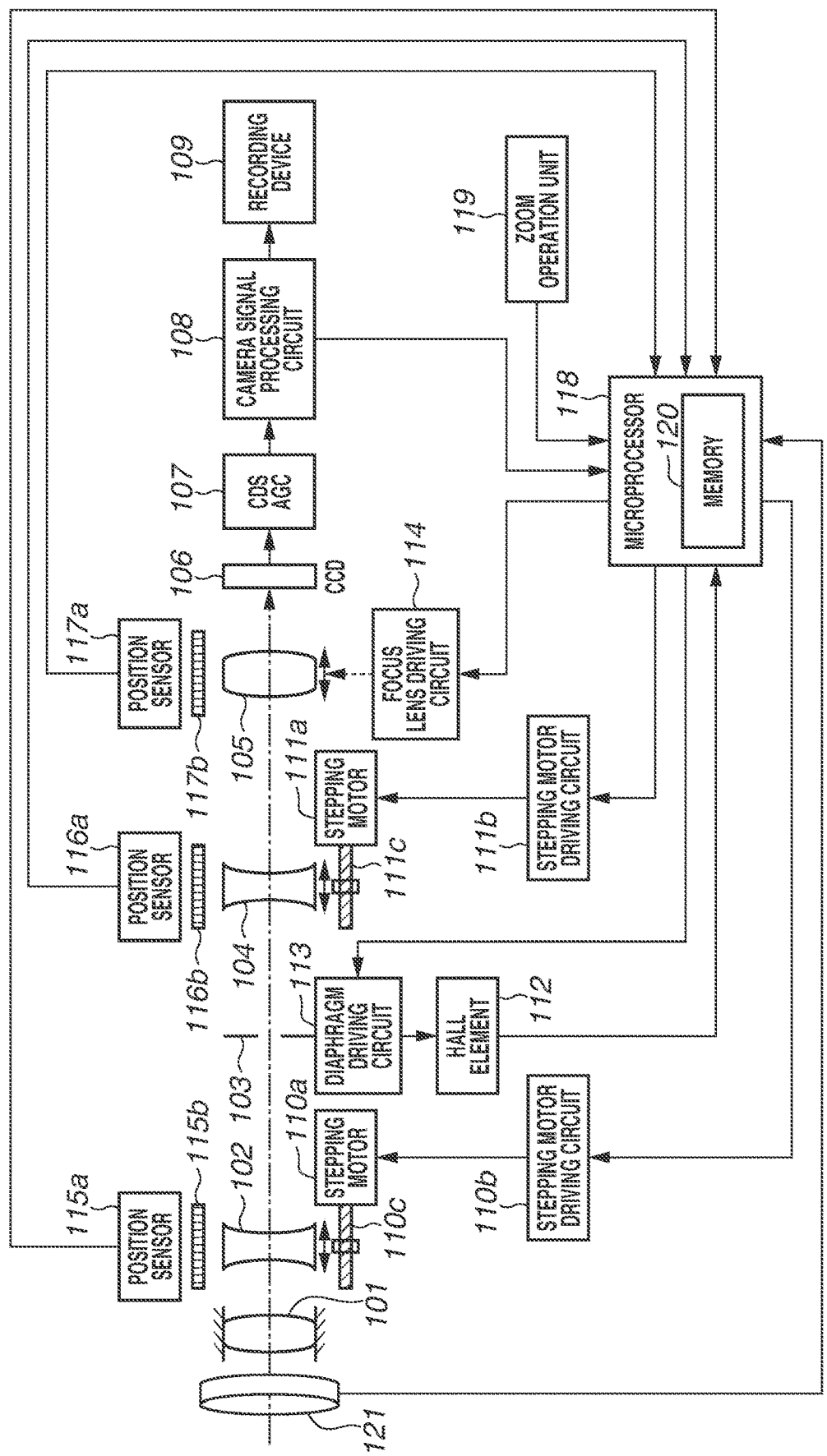
FIG. 1 is a diagram illustrating a configuration of an imaging apparatus according to first and second exemplary embodiments.

FIG. 1 illustrates a configuration of a video camera (an imaging apparatus) according to the present exemplary embodiment. While a video camera is described in the present exemplary embodiment, the present exemplary embodiment is also be applicable to another imaging apparatus such as a digital still camera.

The imaging apparatus illustrated in FIG. 1 includes, as an imaging optical system, a first fixed lens 101, a zoom lens 102, a diaphragm unit 103, an auxiliary lens 104, and a focus lens 105 in order from a subject side (a left side in FIG. 1). The zoom lens 102 (a first magnification varying lens) moves in an optical axis direction to perform zooming. The auxiliary lens 104 (a second magnification varying lens) moves in the optical axis direction based on the position of the zoom lens 102 to support the zooming of the zoom lens 102. The focus lens 105 is a focus compensator lens having both a function of correcting the movement of a focal plane with zooming, and a focusing function for adjusting an in-focus position.

An image sensor 106 is a photoelectric conversion device, such as a charge-coupled device (CCD) sensor or a complementary metal-oxide-semiconductor (CMOS) sensor, and captures a subject image formed by the imaging optical system. A correlated double sampling/automatic gain control (CDS/AGC) circuit 107 samples the output of the image sensor 106 for gain adjustment. A camera signal processing circuit 108 converts a signal output from the CDS/AGC circuit 107 into a signal compatible with a recording device 109, and transmits an image signal of a still image or a video signal of a moving image, which is obtained by the conversion, to the recording device 109. The recording device 109 controls the recording of the moving image or the still image and records the image signal or the video signal in a recording medium (not illustrated). As the recording medium, a magnetic tape, a semiconductor memory, or a Digital Versatile Disc (DVD) can be used.

A stepping motor driving circuit 110b controls the driving of a stepping motor 110a serving as a driving source for driving the zoom lens 102. The stepping motor 110a is engaged with a feed screw shaft 110c serving as an output shaft. When the stepping motor 110a is driven to rotate the feed screw shaft 110c, the engagement action between the feed screw shaft 110c and a rack drives the zoom lens 102 in the optical axis direction (indicated by a double arrow in FIG. 1).

In a case where the stepping motor 110a drives the zoom lens 102 to a target position, the stepping motor driving circuit 110b first sets, at startup of the imaging apparatus, the zoom lens 102 at a position (a reference position) serving as a reference for position control. Then, the stepping motor driving circuit 110b inputs, to the stepping motor 110a, a driving signal having pulses corresponding to the number of pulses for moving the zoom lens 102 from the reference position to the target position. Thus, in the imaging apparatus, a reference position sensor that detects whether the zoom lens 102 is located at the reference position is provided. In the present exemplary embodiment, the reference position sensor is formed of a photointerrupter in which a light-emitting element and a light-receiving element are integrated together. A light-blocking member provided in a holding frame of the zoom lens 102 enters between the light-emitting element and the light-receiving element of the photointerrupter, and blocks the light traveling from the light-emitting element to the light-receiving element, whereby the zoom lens 102 is detected as being located at the reference position. The light-blocking member is formed into a shape that allows detection of whether the zoom lens 102 is in a zone on the telephoto side or a zone on the wide-angle side.

A position scale 115b for detecting the position of the zoom lens 102 is fixed to the holding frame of the zoom lens 102. A position sensor 115a is fixed to a lens barrel portion at a position opposed to the position scale 115b. In the position scale 115b, a scale pattern such as a magnetic pattern or a light reflection pattern is generated in the optical axis direction. The position sensor 115a reads a magnetic signal or a light reflection signal based on the position of the position scale 115b. This enables detection of the position of the zoom lens 102 in the optical axis direction. A detection signal of the position sensor 115a is input to a microprocessor 118 (described below) and is used to control the position of the zoom lens 102.

A stepping motor driving circuit 111b controls the driving of a stepping motor 111a serving as a driving source for driving the auxiliary lens 104. The stepping motor 111a is engaged with a feed screw shaft 111c serving as an output shaft. When the stepping motor 111a is driven to rotate the feed screw shaft 111c, the engagement action between the feed screw shaft 111c and a rack drives the auxiliary lens 104 in the optical axis direction (indicated by a double arrow in FIG. 1).

In a case where the stepping motor 111a drives the auxiliary lens 104 to a target position, the stepping motor driving circuit 111b first sets, at startup of the imaging apparatus, the auxiliary lens 104 at a position (a reference position) serving as a reference for position control. Then, the stepping motor driving circuit 111b inputs, to the stepping motor 111a, a driving signal having pulses corresponding to the number of pulses for moving the auxiliary lens 104 from the reference position to the target position. Thus, in the imaging apparatus, a reference position sensor that detects whether the auxiliary lens 104 is located at the reference position is provided. In the present exemplary embodiment, the reference position sensor has a configuration similar to that of the reference position sensor for the zoom lens 102, and thus the detailed description thereof will be omitted. Using a photointerrupter in which a light-emitting element and a light-receiving element are integrated together, the auxiliary lens 104 is detected as being located at the reference position.

A position scale 116b for detecting the position of the auxiliary lens 104 is fixed to a holding frame of the auxiliary lens 104. A position sensor 116a is fixed at a position opposed to the position scale 116b. Configurations of the position scale 116b and the position sensor 116a are similar to those of the position scale 115b and the position sensor 115a for the zoom lens 102, respectively, and thus the description thereof will be omitted. A detection signal of the position sensor 116a is input to the microprocessor 118, and the detection result of the position of the auxiliary lens 104 in the optical axis direction is used to control the position of the auxiliary lens 104.

A focus lens driving circuit 114 includes a voice coil motor (VCM) serving as a driving source and a driving circuit for the VCM, and drives the focus lens 105 to a target position. A position scale 117b for detecting the position of the focus lens 105 is fixed to a holding frame of the focus lens 105. A position sensor 117a is fixed at a position opposed to the position scale 117b. In the position scale 117b, a scale pattern such as a magnetic pattern or a light reflection pattern is generated in the optical axis direction. The position sensor 117a reads a magnetic signal or a light reflection signal based on the position of the position scale 117b. This enables detection of the position of the focus lens 105 in the optical axis direction. A detection signal of the position sensor 117a is input to the microprocessor 118, and the microprocessor 118 feeds back position information regarding the focus lens 105, thereby forming a servo control system.

While the focus lens 105 is assumed to be driven by the VCM in the present exemplary embodiment, a configuration using another type of actuator such as a direct current (DC) motor or an ultrasonic motor may be employed. Alternatively, a stepping motor may be used as the driving source of the focus lens 105, and the position sensor 117a and the position scale 117b attached to the holding frame of the focus lens 105 may be eliminated. This is because the position sensor 117a for the focus lens 105 is used to form the servo control system using the VCM and is also used to acquire the position of the focus lens 105, whereas in a case where a stepping motor is used as the driving source of the focus lens 105, a pulse count can be treated as position information.

As the driving source of the focus lens 105, an actuator having a stop accuracy higher than those of the zoom lens 102 and the auxiliary lens 104 is used. This enables correction of the positions of the zoom lens 102 and the auxiliary lens 104. The stop accuracy is determined based on the position sensitivity of each of the zoom lens 102 and the auxiliary lens 104 or the depth of focus of the imaging optical system included in the imaging apparatus.

The microprocessor 118 functions as a control unit that controls the entire operation of the imaging apparatus based on inputs from a zoom operation unit 119 and various operation switches (not illustrated) such as a power switch and an image recording switch.

The zoom operation unit 119 can include a seesaw lever or a button for giving an instruction to move to the wide-angle side and a button for giving an instruction to move to the telephoto side, and an electronic ring for giving an instruction to change the zoom magnification using rotation. Alternatively, a plurality of the zoom operation units 119 may be provided. When the zoom operation unit 119 is operated, an operation signal indicating an operation direction and an operation amount is output to the microprocessor 118. Based on this information, the microprocessor 118 calculates the driving speeds and the driving directions of the zoom lens 102 and the auxiliary lens 104, and outputs driving commands to the stepping motor driving circuits 110b and 111b based on the calculation results, thereby moving the zoom lens 102 along the optical axis.

In a memory 120 provided in the microprocessor 118, the positions of an end (a telephoto end) on the telephoto side and an end (a wide-angle end) on the wide-angle side relative to the reference position of the zoom lens 102 are stored. The stepping motors 110a and 111a are driven based on forward/reverse signals input to the two stepping motor driving circuits 110b and 111b from the microprocessor 118, respectively. The focus lens driving circuit 114 is driven by a control signal from the microprocessor 118. As described above, the microprocessor 118 functions as a lens control unit that controls lens driving. A zooming operation of the imaging optical system and a focusing operation associated with the zooming operation are performed by controlling the stepping motor 111a serving as the driving source of the auxiliary lens 104 and the focus lens driving circuit 114, using an electronic cam method based on cam trajectory data, which is generally used in a video camera. The cam trajectory data is stored in the memory 120 of the microprocessor 118. The imaging optical system according to the present exemplary embodiment includes the zoom lens 102, the auxiliary lens 104, and the focus lens 105. Generally, in such an imaging optical system, auxiliary lens cam data indicating the positional relationship between the zoom lens 102 and the auxiliary lens 104 and focus cam data indicating the positional relationship between the zoom lens 102 and the focus lens 105 are used as the cam trajectory data. This type of cam trajectory data is described also in the present exemplary embodiment. The method for driving each of the stepping motors 110a and 111a used in the present exemplary embodiment is not particularly limited, and a 1-2 phase driving method or a 2-2 phase driving method may be used. In the memory 120, the position sensitivity of each of the auxiliary lens 104 and the focus lens 105 is stored.

The diaphragm unit 103 includes a diaphragm driving circuit 113 including an actuator using a galvanometer method (not illustrated), a diaphragm blade that is driven to open and close by the actuator, and a position detection element (a Hall element) 112 that detects the opened or closed state of the diaphragm.

The microprocessor 118 performs feedback control of the actuator of the diaphragm driving circuit 113 so that an input luminance signal component constantly has an appropriate value. At this time, an output from the position detection element 112 is amplified, and the amplified output is converted from an analog signal to a digital signal by an analog-to-digital (A/D) conversion circuit (not illustrated). Then, the digital signal is input to the microprocessor 118, as information indicating the opened or closed position of the diaphragm.

Based on this diaphragm position information, the microprocessor 118 transmits an opening or closing signal to the diaphragm driving circuit 113 so that the luminance signal component constantly has the appropriate value, thereby controlling the diaphragm unit 103. The microprocessor 118 can also transmit an opening or closing signal for fixing the position of the diaphragm to a predetermined opened or closed position, to the diaphragm driving circuit 113.

A focus operation unit 121 is an operation member used to drive the focus lens 105. The focus operation unit 121 transmits operation information, such as an operation amount and an operation speed, to the microprocessor 118. The microprocessor 118 outputs a driving command to the focus lens driving circuit 114 based on the operation information from the focus operation unit 121, thereby implementing a manual focus operation. Alternatively, the microprocessor 118 may perform focus detection based on a video signal from the camera signal processing circuit 108, and output a driving command to the focus lens driving circuit 114 based on the focus detection result.

Figure 2:
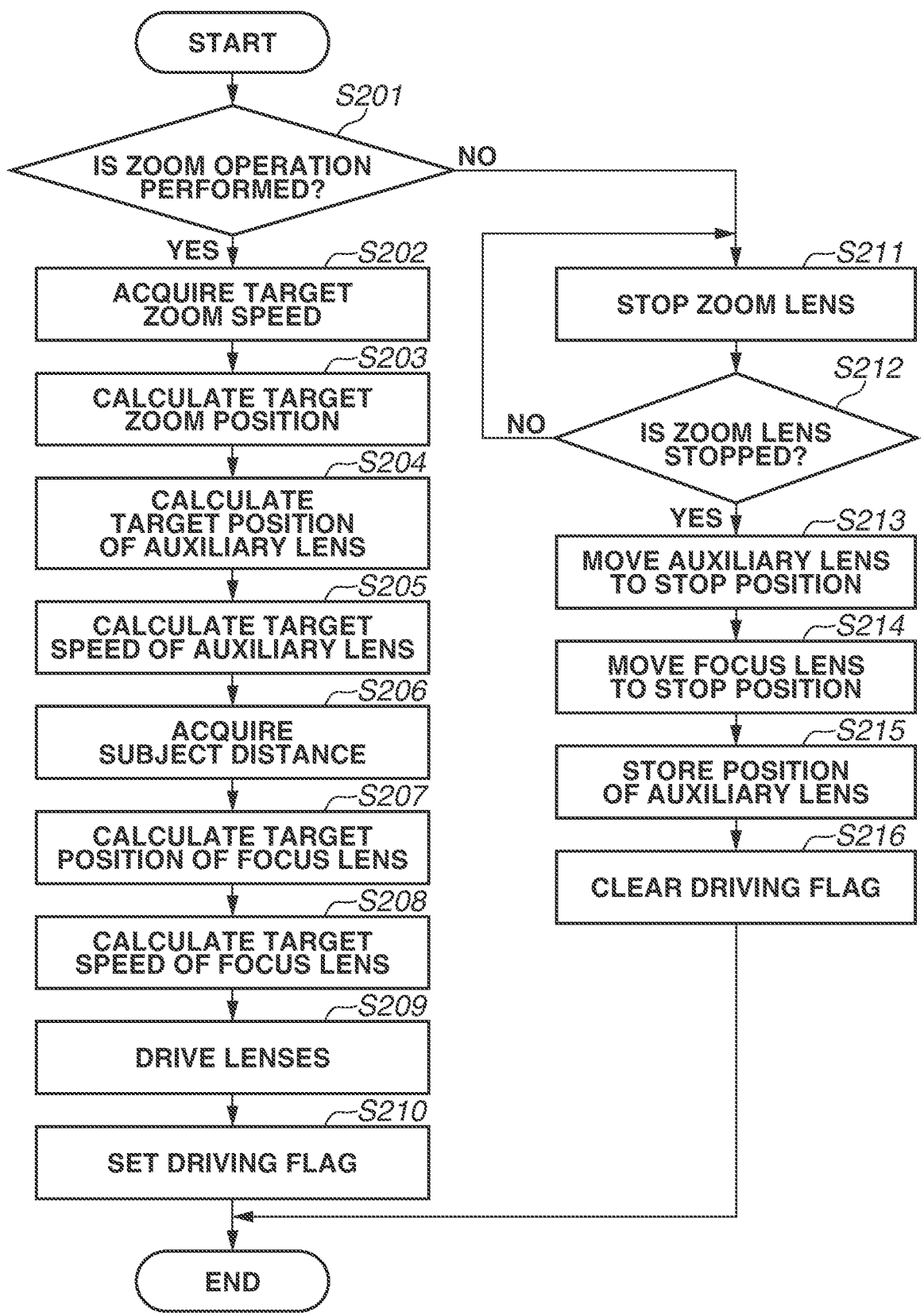
FIG. 2 is a flowchart illustrating zooming processing according to the first and second exemplary embodiments.

A control program for zoom driving, which is executed by the microprocessor 118, will be described in detail with reference to a flowchart in FIG. 2. Processing in steps S201 to S216 in FIG. 2 is periodically repeated with a period $\Delta T$. The processing is started when the main body of the camera is powered on. Then, the processing is performed by the microprocessor 118 receiving outputs from the memory 120, the zoom operation unit 119, and the position sensors 115a, 116a, and 117a, and then controlling the stepping motor driving circuits 110b and 111b and the focus lens driving circuit 114. Alternatively, the processing may be started in response to a change from a reproduction mode for displaying a captured image or a setting mode for making various settings to an image capturing mode for waiting for the capturing of an image.

In step S201, it is determined whether the zoom operation unit 119 is operated (whether an operation signal is input). If the zoom operation unit 119 is operated (YES in step S201), the processing proceeds to step S202. In step S202, a target zoom speed Vz of the zoom lens 102 is acquired based on information regarding the operation amount included in the operation signal. Then, the processing proceeds to step S203. In step S203, a target zoom position Zt is acquired. Assuming that a current zoom position, which is indicated by a driving counter of the stepping motor driving circuit 110b, is Z and the control period is $\Delta T$, the target zoom position Zt can be calculated using the following formula (1).

$$Zt=Z+Vz\times\Delta T \qquad (1)$$

Figure 3:
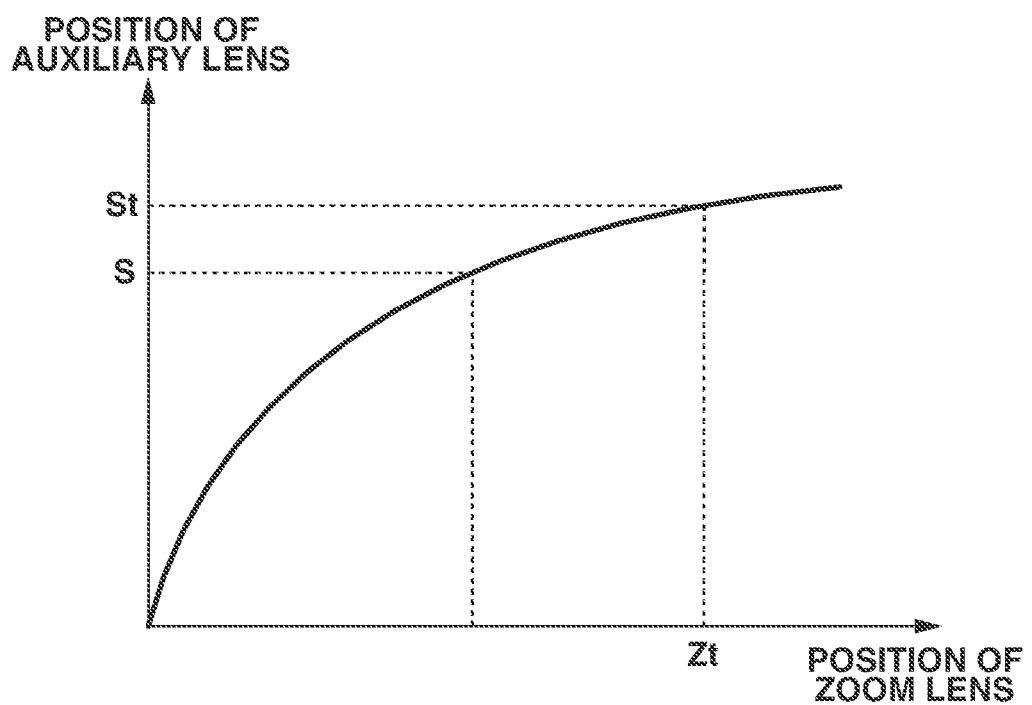
FIG. 3 is a diagram illustrating cam data on an auxiliary lens.

Next, the processing proceeds to step S204. In step S204, a target driving position of the auxiliary lens 104 is determined. FIG. 3 illustrates the positional relationship between the zoom lens 102 and the auxiliary lens 104. Information corresponding to the positional relationship in FIG. 3 is stored in the memory 120 of the microprocessor 118, as the auxiliary lens cam data. In step S204, a target auxiliary lens position St corresponding to the target zoom position Zt is acquired based on the target zoom position Zt calculated using the formula (1) and the auxiliary lens cam data.

Subsequently, the processing proceeds to step S205. In step S205, using a current position S of the auxiliary lens 104, which is indicated by a driving counter of the stepping motor driving circuit 111b, a target speed Vs of the auxiliary lens 104 is calculated using the following formula (2).

$$Vs=(St-S)/\Delta T \qquad (2)$$

Next, the processing proceeds to step S206. In step S206, a subject distance L is acquired as the distance to a current subject, based on position information regarding the focus lens 105 input from the position sensor 117a. The subject distance L is acquired on the assumption that, before the zoom lens 102 is driven, the subject is in focus at the detected position of the focus lens 105. More specifically, the subject distance L is acquired by referring to the cam data stored in the memory 120, the position of the focus lens 105, and the current position Z of the zoom lens 102.

Figure 4:
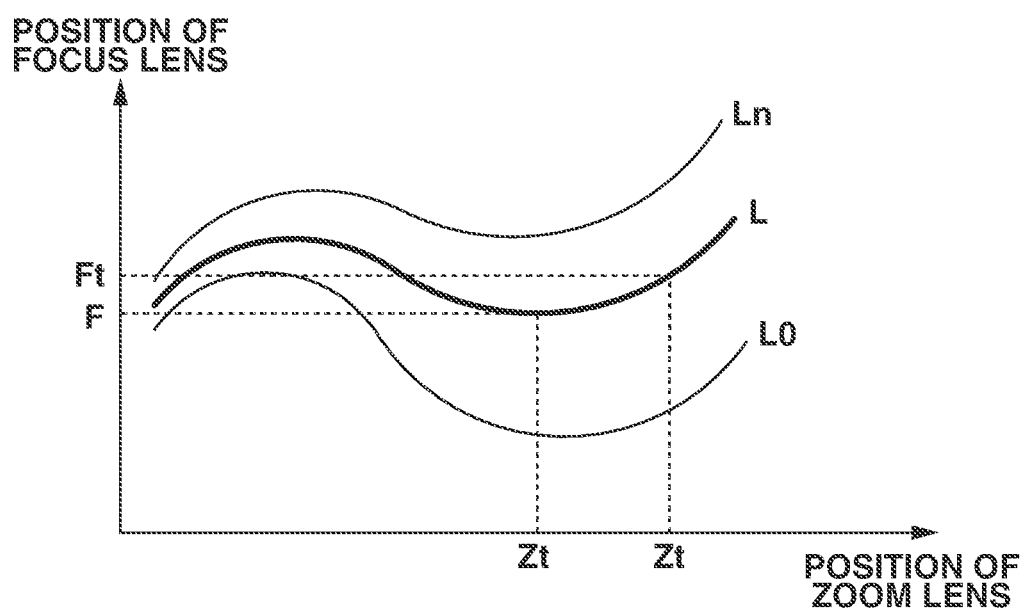
FIG. 4 is a diagram illustrating cam data on a focus lens.

Subsequently, the processing proceeds to step S207. In step S207, a target driving position of the focus lens 105 is determined. FIG. 4 illustrates the focus cam data indicating the positional relationship between the zoom lens 102 and the focus lens 105. The focus cam data is stored in the memory 120 of the microprocessor 118, as a plurality of pieces of table data corresponding to discrete subject distances L0 to Ln. The focus cam data corresponding to the subject distance L acquired in step S206 is called from the memory 120. Alternatively, the focus cam data on the subject distance L may be calculated by interpolation calculation based on pieces of focus cam data on the next smaller and larger subject distances. Using the called focus cam data on the subject distance L, a target focus lens position Ft corresponding to the target zoom position Zt calculated using the formula (1) in step S203 is acquired.

Subsequently, the processing proceeds to step S208. In step S208, using a current position F of the focus lens 105 input from the position sensor 117a, a target speed Vf of the focus lens 105 is calculated using the following formula (3).

$$Vf=(Ft-F)/\Delta T \quad (3)$$

In step S209, the target positions and the target speeds are transmitted to the stepping motor driving circuit 110b that drives the zoom lens 102, the stepping motor driving circuit 111b that drives the auxiliary lens 104, and the focus lens driving circuit 114 that drives the focus lens 105. This enables the driving of the zoom lens 102, the auxiliary lens 104, and the focus lens 105. Then, the processing proceeds to step S210. In step S210, a driving flag f indicating that the zooming operation is being driven is set.

On the other hand, in a case where an operation signal is not input from the zoom operation unit 119 in step S201 (NO in step S201), the processing proceeds to step S211. In step S211, the driving of the lenses (the zoom lens 102, the auxiliary lens 104, and the focus lens 105) is stopped, and a stabilization operation for stabilizing the lenses is controlled.

In step S211, a stop command to stop the zoom lens 102 is transmitted to the stepping motor driving circuit 110b. In step S212, it is determined whether the driving of the zoom lens 102 is stopped. In a case where the driving of the zoom lens 102 is stopped (YES in step S211), the processing proceeds to step S213. In a case where the driving of the zoom lens 102 is not stopped (NO in step S211), the processing returns to step S211. In step S211, the stop command is transmitted to the stepping motor driving circuit 110b again.

In step S213, a stop position Ss of the auxiliary lens 104 is acquired, the auxiliary lens 104 is moved to the acquired stop position Ss, and then the driving of the auxiliary lens 104 is stopped. The method for calculating the stop position Ss is similar to the method used in step S204. The stop position Ss of the auxiliary lens 104 is calculated using a stop position of the zoom lens 102 and the auxiliary lens cam data illustrated in FIG. 3.

In step S214, a stop position Fs of the focus lens 105 is acquired, the focus lens 105 is moved to the acquired stop position Fs, and then the driving of the focus lens 105 is stopped. The method for calculating the stop position Fs is similar to the method used in step S207. The stop position Fs of the focus lens 105 is acquired using the stop position of the zoom lens 102 and the focus cam data illustrated in FIG. 4. Through the operations in steps S211 to S214, the stabilization operation for stabilizing the lenses (the zoom lens 102, the auxiliary lens 104, and the focus lens 105) is performed.

In step S215, the position of the auxiliary lens 104 is acquired from the output of the position sensor 116a, and is stored in the memory 120 as the stop position Ss of the auxiliary lens 104 at the time of stabilization. Then, in step S216, the driving flag f set in step S210 is cleared.

In step S207, the target focus position is calculated as a position within a focus driving range (a driving range of the focus lens 105). The driving range of the focus lens 105 is set to a range including a position (an infinity position) where a subject of which the subject distance L is infinity is brought into focus and a position (a closest position) where a subject of which the subject distance L is the closest distance at which the subject can be imaged is brought into focus, or set to a range where an adequate margin is added to the positions. In other words, a control end on the infinity side of the focus lens 105 is set to be located outside (on the opposite side of the closest position) further than the infinity position by the margin. A control end on the closest side is set to be located outside (on the opposite side of the infinity position) further than the closest position by the margin. However, if the position of the auxiliary lens 104 is shifted from the stabilized position due to a temperature change, there is a possibility that either the infinity position or the closest position may have an insufficient margin at the control end or fall outside the driving range, depending on the shift amount of the position or the position sensitivity of the auxiliary lens 104. To address the issue, in the present exemplary embodiment, the focus driving range is set based on the position of the auxiliary lens 104. This makes it possible to achieve excellent focus operability even in a case where temperature expansion and contraction differs from individual to individual.

A program for setting the focus driving range will be described in detail with reference to a flowchart in FIG. 5. Processing in FIG. 5 is performed by the microprocessor 118 receiving outputs from the memory 120 and the position sensor 116a for the auxiliary lens 104. The processing is also periodically repeated with a period $\Delta T$ and is performed in parallel with the flowchart in FIG. 2. The period $\Delta T$ may be different from that in the flowchart in FIG. 2.

First, in step S501, it is determined based on the driving flag f whether the zoom operation is currently being driven. If the driving flag f is not set, it is determined that the zoom operation is not currently being driven (NO in step S501), and the processing ends. If the driving flag f is set, it is determined that the zoom operation is currently being driven (YES in step S501), and the processing proceeds to step S502. In step S502, the stop position Ss of the auxiliary lens 104 at the time of stabilization, which is stored in step S215 in FIG. 2, is acquired from the memory 120. In step S503, a current position Sc of the auxiliary lens 104 is acquired from the position sensor 116a.

Next, the processing proceeds to step S504. In step S504, based on the stop position Ss of the auxiliary lens 104 at the time of stabilization, which is acquired in step S502, and the current position Sc of the auxiliary lens 104 acquired in step S503, a position difference $\Delta S$ that is the shift amount of the position of the auxiliary lens 104 is calculated using the following formula (4).

$$\Delta S=Sc-Ss \quad (4)$$

Subsequently, the processing proceeds to step S505. In step S505, position sensitivity Ks of the auxiliary lens 104 is acquired from the memory 120. The position sensitivity Ks is the ratio between a movement amount of the auxiliary lens 104 and a movement amount ΔP of an image plane on which an image is formed. The higher the position sensitivity Ks is, the greater the movement amount ΔP of the image plane is even with a slight movement of the auxiliary lens 104.

Assuming that the auxiliary lens 104 moves by ΔX, the movement amount ΔP of the image plane can be represented by the following formula (5).

$$\Delta P = \Delta X \times Ks \quad (5)$$

Subsequently, the processing proceeds to step S506. In step S506, infinity position sensitivity Kff and closest position sensitivity Kfn of the focus lens 105 are acquired from the memory 120. The position of the focus lens 105 changes depending on the subject distance L, and thus the position sensitivity of the focus lens 105 also differs depending on the subject distance L. The infinity position sensitivity Kff is the position sensitivity of the focus lens 105 in focusing on the infinity position. The closest position sensitivity Kfn is the position sensitivity of the focus lens 105 in focusing on the closest position where the subject can be imaged. Each of the infinity position sensitivity Kff and the closest position sensitivity Kfn is the ratio between a movement amount of the focus lens 105 and a movement amount of the image plane on which an image is formed. The higher the sensitivity is, the greater the movement amount of the image plane is even with a slight movement of the focus lens 105. Assuming that the auxiliary lens 104 moves by ΔY, a movement amount ΔQf of the image plane at infinity can be represented by the following formula (6), and a movement amount ΔQn of the image plane at the closest position can be represented by the following formula (7).

$$\Delta Qf = \Delta Y \times Kff \quad (6)$$

$$\Delta Qn = \Delta Y \times Kfn \quad (7)$$

In step S507, the correction amounts of the ends (the control ends) of the driving range of the focus lens 105 associated with the shift of the auxiliary lens 104 are determined. A movement amount ΔPs of the image plane by the auxiliary lens 104 is calculated using the following formula (8). The formula (8) is obtained by applying the position difference ΔS of the auxiliary lens 104 calculated in the above processing to the formula (5).

$$\Delta Ps = Ks \times \Delta S \quad (8)$$

Next, a movement amount ΔFf of the infinity position of the focus lens 105 at focus infinity is calculated using the following formula (9). The formula (9) is obtained by applying the calculated movement amount ΔPs of the image plane to the formula (6).

$$\Delta Ff = \Delta Ps / Kff \quad (9)$$

Similarly, a movement amount ΔFn of the closest position of the focus lens 105 at the focus closest distance is calculated using the following formula (10). The formula (10) is obtained by applying the movement amount ΔPs of the image plane to the formula (7).

$$\Delta Fn = \Delta Ps / Kfn \quad (10)$$

Subsequently, the processing proceeds to step S508. In step S508, the driving range of the focus lens 105 is corrected using the movement amount ΔFf of the infinity position and the movement amount ΔFn of the closest position. Assuming that the positions of the drive control ends at infinity and the closest distance of the focus lens 105 before the correction are Lmf and Lmn, respectively, a stroke Ln of the focus lens 105 can be obtained using the following formula (11).

$$Ln = Lmn - Lmf (Lmf < Lmn) \quad (11)$$

Figure 6A:
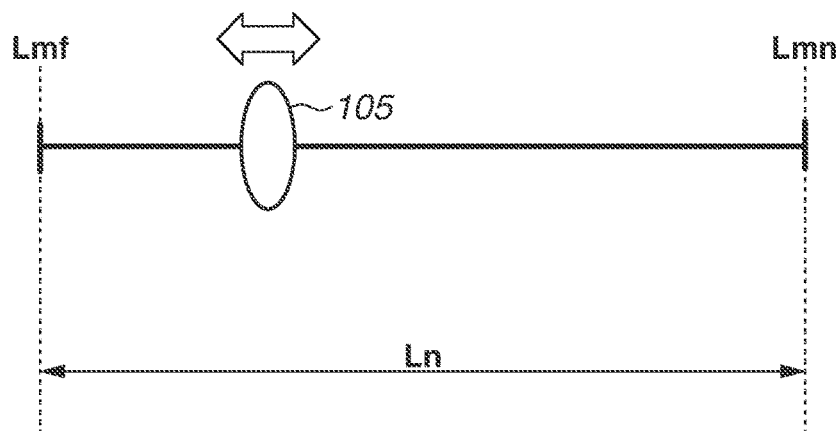
FIG. 6A is a schematic diagram illustrating the driving range of the focus lens.
Figure 6B:
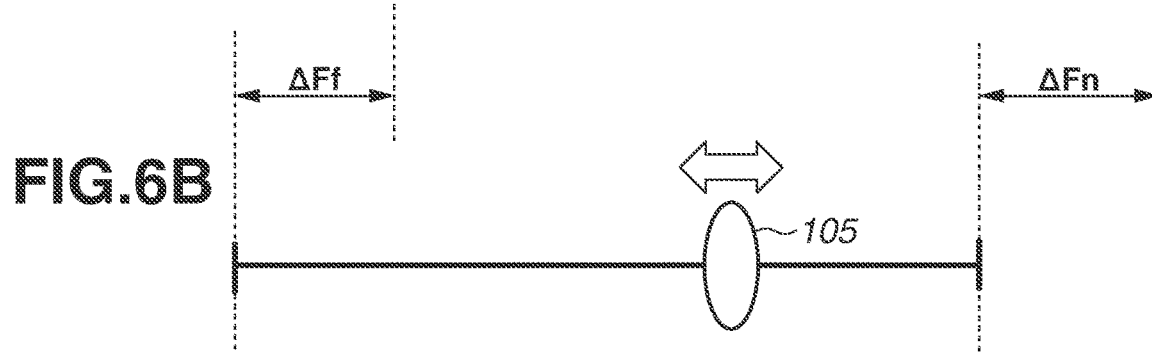
FIG. 6B is another schematic diagram illustrating the driving range of the focus lens.

Before the driving range is corrected, the focus lens 105 is driven in the range from the position Lmf to the position Lmn as illustrated in FIG. 6A. In this step, the driving range of the focus lens 105 is corrected so that the focus lens 105 can move along a stroke L' from (Lmf−ΔFf) to (Lmn−ΔFn) as illustrated in FIG. 6B. Even in a case where the position where the focus lens 105 is currently at rest falls outside the driving range newly set in step S508, it is desirable not to move the focus lens 105 into the driving range unless a zoom operation or a focus operation is input. This is because moving the focus lens 105 changes the image magnification, and thus there is a possibility that a change in the image magnification unintended by the user may occur.

As described above, even in a case where the auxiliary lens 104 moves without the user's intention due to a temperature change, the driving range of the focus lens 105 is set again based on the movement amount (the shift amount) of the auxiliary lens 104, whereby it is possible to secure a certain amount of margin from the infinity position to the control end on the infinity side, and a certain amount of margin from the closest position and the control end on the closest side. This makes it possible to focus on even a subject at the infinity position or at the closest distance, and therefore to achieve an excellent focus operation.

In a case where the driving range is set using a temperature sensor, it is difficult to consider variation from individual to individual in the movement amount of the auxiliary lens 104 as described above. If the position sensitivity Ks of the auxiliary lens 104 is not high, variation in the movement amount ΔP of the image plane associated with the variation in the movement amount of the auxiliary lens 104 is not large. Thus, the driving range can be set based on the temperature detected by the temperature sensor in consideration of the variation in the movement amount ΔP of the image plane. However, if the position sensitivity Ks of the auxiliary lens 104 is high, the variation in the movement amount ΔP of the image plane associated with the variation in the movement amount of the auxiliary lens 104 is large. If the driving range is set in consideration of the large variation, the margin varies greatly between an individual that moves by a small amount with a temperature change and an individual that moves by a large amount with a temperature change. Thus, an individual having an excessively large margin occurs. In the present exemplary embodiment, since the driving range of the focus lens 105 is set based on the movement amount of the auxiliary lens 104 as described above, it is possible to mitigate such an issue.

Figure 7:
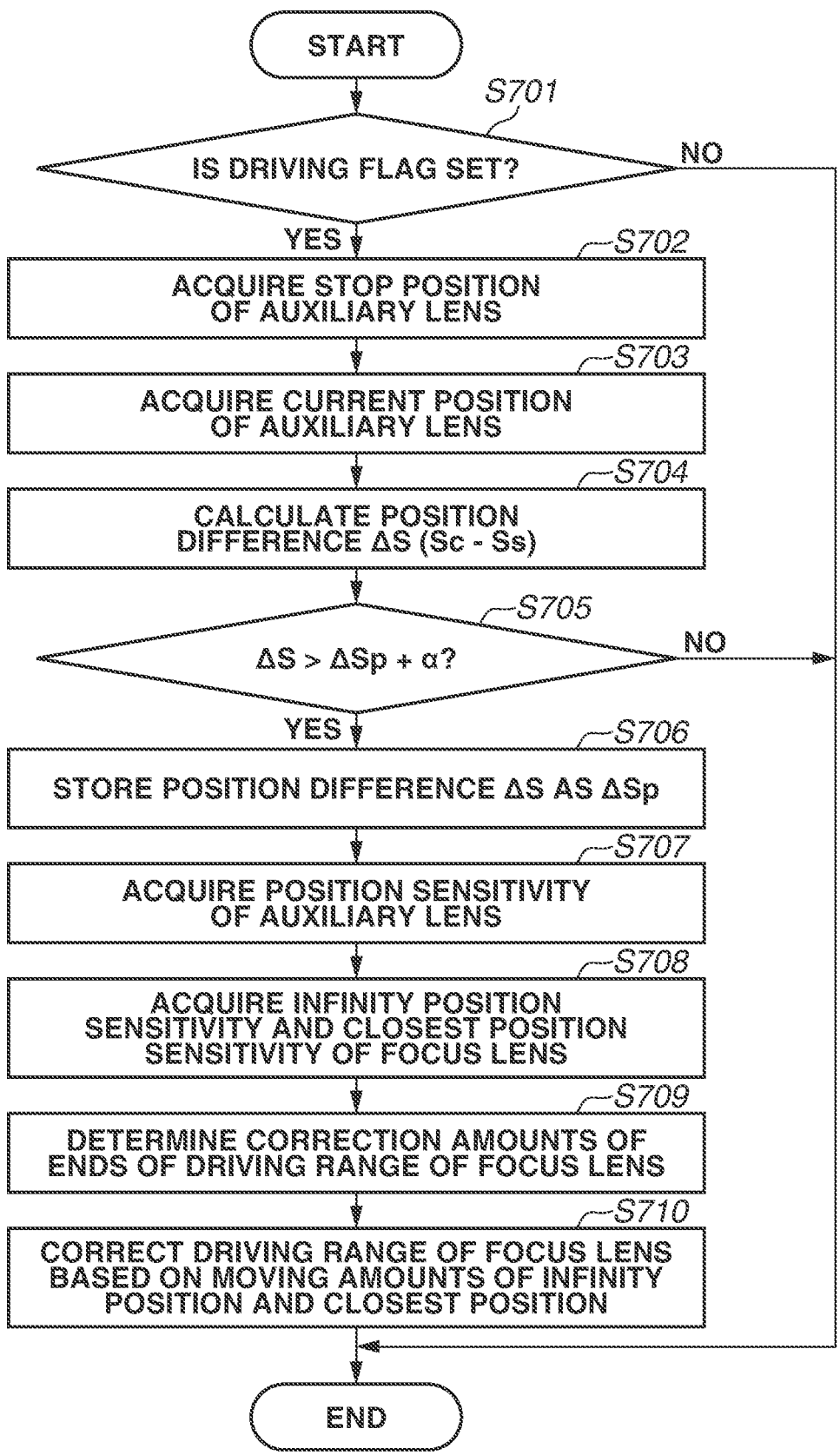
FIG. 7 is a flowchart illustrating processing for setting the driving range of the focus lens according to the second exemplary embodiment.

A second exemplary embodiment of the disclosure will be described. Description of parts similar to those in the first exemplary embodiment will be omitted. The second exemplary embodiment is different from the first exemplary embodiment in a program for changing the driving range of the focus lens 105 that is executed by the microprocessor 118. Thus, the program will be described in detail with reference to a flowchart in FIG. 7.

Processing in steps S701 to S704 is similar to that in steps S501 to S504 in the first exemplary embodiment, and thus detailed description thereof will be omitted. First, in step S701, it is determined whether the zoom operation is currently being driven. If it is determined that the zoom operation is not currently being driven (NO in step S701), the processing ends. If it is determined that the zoom operation is currently being driven (YES in step S701), the processing proceeds to step S702. In step S702, the stop position Ss of the auxiliary lens 104 at the time of stabilization, which is stored in step S215, is acquired from the memory 120. In step S703, the current position Sc of the auxiliary lens 104 is acquired from the position sensor 116a. In step S704, the position difference $\Delta S$ of the auxiliary lens 104 is calculated using the above formula (4) based on the stop position Ss of the auxiliary lens 104 at the time of stabilization that is acquired in step S702 and the current position Sc of the auxiliary lens 104 acquired in step S703. The processing then proceeds to step S705.

In step S705, a magnitude of the position difference $\Delta S$ calculated in step S704, which is the shift amount of the position of the auxiliary lens 104, and a magnitude of a sum $\Delta Sp+\alpha$, which is a sum of a stored position difference $\Delta Sp$ of the auxiliary lens 104 stored in step S706 (described below) and a fixed value $\alpha$, are compared with each other. If the position difference $\Delta S$ is greater than the sum $\Delta Sp+\alpha$ (YES in step S705), the processing proceeds to step S706. If the position difference $\Delta S$ is less than or equal to the sum $\Delta Sp+\alpha$ (NO in step S705), the processing ends.

In step S706, the position difference $\Delta S$ of the auxiliary lens 104 is stored as the stored position difference $\Delta Sp$. The stored position difference $\Delta Sp$ is stored every time the driving range of the focus lens 105 is corrected in the next step, i.e., from step S707 to step 710. More specifically, the second exemplary embodiment is different from the first exemplary embodiment in that in step S705, it is determined whether the shift amount of the position of the auxiliary lens 104 in a period from the timing when the position difference $\Delta S$ is calculated when the driving range is changed last time to the timing when the position difference $\Delta S$ is calculated this time is greater than the predetermined value $\alpha$, and then if the shift amount of the position in the period from the timing when the position difference $\Delta S$ is calculated when the driving range is set last time to the timing when the position difference $\Delta S$ is calculated this time is greater than the predetermined value $\alpha$, the driving range is set again. If the shift amount of the position is less than or equal to the predetermined value $\alpha$, the set driving range is maintained. The stored position difference $\Delta Sp$ is initialized to 0 in processing during power-on.

Next, the processing proceeds to step S707. Steps S707 to S710 are similar to steps S505 to S508 in the first exemplary embodiment, and thus detailed description thereof will be omitted. In step S707, the position sensitivity Ks of the auxiliary lens 104 is acquired from the memory 120. In step S708, the infinity position sensitivity Kff and the closest position sensitivity Kfn of the focus lens 105 are acquired from the memory 120. In step S709, the correction amounts of the drive control ends of the focus lens 105 associated with the shift of the auxiliary lens 104 are determined. Based on the position difference $\Delta S$ acquired in step S704 and the position sensitivity Ks acquired in step S707, the movement amount $\Delta Ps$ of the image plane by the auxiliary lens 104 is calculated using the above formula (8). Then, using the calculated movement amount $\Delta Ps$ of the image plane and the above formula (9), the movement amount $\Delta Ff$ of the infinity position of the focus lens 105 is calculated. Similarly, using the calculated movement amount $\Delta Ps$ of the image plane and the above formula (10), the movement amount $\Delta Fn$ of the closest position of the focus lens 105 at the focus closest distance is calculated. In step S710, the driving range of the focus lens 105 is changed using the movement amount $\Delta Ff$ of the infinity position and the movement amount $\Delta Fn$ of the closest position that are calculated in step S709.

As a result, even if the position of the auxiliary lens 104 moves due to a temperature after the zoom operation stops, the driving range of the focus lens 105 is corrected in a case where the movement amount (the shift amount) is greater than the predetermined value $\alpha$. This makes it possible to secure a certain amount of margin from the infinity position to the control end on the infinity side and a certain amount of margin from the closest position to the control end on the closest side to the extent that it is possible to focus on a subject at infinity or at the closest distance even when the auxiliary lens 104 moves. As a result, it is possible to achieve an excellent focus operation. Unlike the first exemplary embodiment, since the driving range of the focus lens 105 is changed if the shift amount of the auxiliary lens 104 exceeds the predetermined value $\alpha$, it is possible to avoid the situation where the driving range constantly changes with a short period $\Delta T$. It is therefore possible to improve the stability of the driving range.

Variations

Variations of the first and second exemplary embodiments will be described. In the above-described exemplary embodiments, the driving range is set based on the position difference $\Delta S$ between the position of the auxiliary lens 104 detected at the time of stabilization and the current position of the auxiliary lens 104. Alternatively, assuming that the position of the auxiliary lens 104 at the time of stabilization matches the target position acquired in step S213, the shift amount between the target position and the current position of the auxiliary lens 104 may be used as the position difference $\Delta S$, and the driving range may be set based on this shift amount.

In the above-described exemplary embodiments, the driving range (a first range) of the focus lens 105 is set in advance, and the control ends of the first range are corrected based on the position difference $\Delta S$ of the auxiliary lens 104, whereby the driving range of the focus lens 105 is set based on the shift amount of the position. The setting method, however, is not limited thereto. For example, if the absolute value of the position difference $\Delta S$ is less than or equal to a first value, the first range is set as the driving range of the focus lens 105. If the position difference $\Delta S$ is greater than the first value and less than or equal to a second value in a positive direction, a second range set in advance is set as the driving range of the focus lens 105. Furthermore, if the position difference $\Delta S$ is greater than the second value, a third range set in advance is set as the driving range of the focus lens 105. In this way, any of the stepwise ranges determined in advance may be set as the driving range of the focus lens 105. In this case, the relationship between the position difference $\Delta S$ of the auxiliary lens 104 and the movement amount of the image plane may be acquired in advance, and the driving range may be determined in advance based on this relationship. Then, data in which each position difference $\Delta S$ and the range is associated with each other may be stored in the memory 120. Similarly, regarding a negative direction, any of ranges determined in advance based on the magnitude of the position difference $\Delta S$ may be set as the driving range of the focus lens 105.

Either the infinity position or the closest position that is closer to the control end (i.e., the position having a smaller margin) is more likely to be influenced by the shift amount.

Thus, the position of the closer control end may be set based on the shift amount of the position of the auxiliary lens 104.

In the first and second exemplary embodiments, the methods for correcting the driving range of the focus lens 105 have been described in order to address the shift of the position (the occurrence of the position difference ΔS) of the auxiliary lens 104 due to a temperature change. Actually, however, due to the expansion and contraction of the lens barrel with a temperature change, the relationship between the position of the focus lens 105 and the subject distance L which corresponds to the position of the focus lens 105 and at which the subject is brought into focus is shifted in some cases. To address this, for example, a conventional method for correcting the shift of the relationship between the position of the focus lens 105 and the subject distance L, such as the method discussed in Japanese Patent No. 4857257, and the methods described in the first and second exemplary embodiments may be used in combination. For example, a temperature sensor is installed in the imaging apparatus, and based on the output of the temperature sensor, the driving range of the focus lens 105 stored in association with the output temperature is read from the memory 120. Then, the read driving range of the focus lens 105 is corrected based on the position difference ΔS using the above-described methods. This makes it possible to handle both the shift of the position of the auxiliary lens 104 due to a temperature change and the shift of the relationship between the position of the focus lens 105 and the subject distance L at which the subject is brought into focus.

While a lens-integrated imaging apparatus has been described in the above-described exemplary embodiments, the exemplary embodiments are also applicable to a lens-interchangeable imaging apparatus. In this case, a processor that functions as a setting unit that sets the driving range of the focus lens 105 may be included in an interchangeable lens apparatus, or may be included in the main body of the camera to which an interchangeable lens can be attached. If the processor is included in the main body of the camera, the processor receives information, such as information regarding the position and the position sensitivity of each lens, and transmits information indicating the driving range to be set, to the interchangeable lens apparatus via a communication unit capable of communicating with the interchangeable lens apparatus.

While the exemplary embodiments of the disclosure have been described in detail above, the disclosure is not limited to these specific exemplary embodiments. The disclosure also includes various embodiments without departing from the spirit and scope of the disclosure. Parts of the above-described exemplary embodiments can be appropriately combined together.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-096819, filed Jun. 9, 2021, which is hereby incorporated by reference herein in its entirety.

What is claimed is:

1. An apparatus for an optical system including a first magnification varying lens configured to move with zooming, a second magnification varying lens of which a position is controlled based on a position of the first magnification varying lens, and a focus lens configured to adjust an in-focus position, the apparatus comprising:
   a detector configured to detect the position of the second magnification varying lens; and
   at least one processor and a memory coupled to the at least one processor storing instructions that, when executed by the at least one processor, cause the at least one processor to function as a setting unit configured to set a driving range of the focus lens based on the position of the second magnification varying lens.

2. The apparatus according to claim 1, wherein the setting unit sets the driving range of the focus lens based on an amount of shift between the position of the second magnification varying lens corresponding to the position of the first magnification varying lens and the detected position of the second magnification varying lens.

3. The apparatus according to claim 2, wherein the setting unit sets the driving range based on the amount of shift, position sensitivity of the second magnification varying lens, and position sensitivity of the focus lens.

4. The apparatus according to claim 2, wherein the setting unit changes a position of a drive control end of the focus lens based on the amount of shift.

5. The apparatus according to claim 2,
   wherein in a case where the amount of shift is less than or equal to a first predetermined value, the setting unit sets a first range as the driving range of the focus lens, and
   wherein in a case where the amount of shift is greater than the first predetermined value, the setting unit sets a second range different from the first range as the driving range of the focus lens.

6. The apparatus according to claim 5, wherein in the case where the amount of shift is greater than the first predetermined value, the setting unit calculates the second range based on the amount of shift, position sensitivity of the second magnification varying lens, and position sensitivity of the focus lens.

7. The apparatus according to claim 5, further comprising a storage configured to store information regarding the driving range,
wherein the first range and the second range are set in advance and stored in the storage.

8. The apparatus according to claim 2, wherein the setting unit compares the amount of shift and an amount of shift that is acquired when the driving range is previously set, and in a case where a difference between the amounts of shift is greater than a predetermined value, the setting unit sets the driving range again.

9. The apparatus according to claim 1,
wherein the at least one processor further functions as a control unit configured to control a position of the focus lens, and
wherein in a case where the focus lens is at rest at a first position and the setting unit changes the driving range of the focus lens from a third range including the first position to a fourth range not including the first position, the control unit maintains the focus lens at the first position.

10. The apparatus according to claim 1, wherein the position of the second magnification varying lens corresponding to the position of the first magnification varying lens is the position detected by the detector when the second magnification varying lens is stabilized.

11. The apparatus according to claim 1, wherein the position of the second magnification varying lens corresponding to the position of the first magnification varying lens is a target position of the second magnification varying lens determined based on the position of the first magnification varying lens.

12. An imaging apparatus comprising:
the apparatus according to claim 1;
the optical system; and
a sensor configured to capture a subject image formed by the optical system.

13. A lens apparatus comprising:
the apparatus according to claim 1; and
the optical system.

14. An imaging apparatus to which a lens apparatus including an optical system is attachable, the optical system including a first magnification varying lens configured to move with zooming, a second magnification varying lens of which a position is controlled based on a position of the first magnification varying lens, and a focus lens configured to adjust an in-focus position, the imaging apparatus comprising:
the apparatus according to claim 1;
a sensor configured to capture a subject image formed by the optical system,
wherein the imaging apparatus transmits information to the lens apparatus indicating a driving range of the focus lens set by the setting unit.

15. The imaging apparatus according to claim 14, wherein the setting unit sets the driving range of the focus lens based on an amount of shift between the position of the second magnification varying lens corresponding to the position of the first magnification varying lens and the detected position of the second magnification varying lens.

16. The imaging apparatus according to claim 14,
wherein the at least one processor further functions as a control unit configured to control a position of the focus lens, and
wherein in a case where the focus lens is at rest at a first position and the setting unit changes the driving range of the focus lens from a third range including the first position to a fourth range not including the first position, the control unit maintains the focus lens at the first position.

17. The imaging apparatus according to claim 14, wherein the position of the second magnification varying lens corresponding to the position of the first magnification varying lens is the position detected by the detector when the second magnification varying lens is stabilized.

18. The imaging apparatus according to claim 14, wherein the position of the second magnification varying lens corresponding to the position of the first magnification varying lens is a target position of the second magnification varying lens determined based on the position of the first magnification varying lens.

* * * * *